United States Patent Office 2,721,856
Patented Oct. 25, 1955

2,721,856

PREPARATION OF SILOXANES CONTAINING CARBOXY GROUPS

Leo H. Sommer, State College, Pa., assignor to Dow Corning Corporation, Midland, Mich., a corporation of Michigan No Drawing. Application March 31, 1953,
Serial No. 346,051

1 Claim. (Cl. 260—46.5)

This invention relates to organosilanes and to the siloxanes derived therefrom.

Disiloxanedicarboxylic acids of the formula

[HOOC(CH₂)ₙSi(CH₃)₂]₂O where $n$ has a value from 2 to 5, are disclosed and claimed in U. S. Patent 2,589,446. It is also disclosed in this patent that when these carboxylic acids are heated in the presence of mineral acids, lactones are formed. Due to this lactone formation, it is not possible to copolymerize the above disiloxanes with other types of siloxanes by means of the well known acid copolymerization method which involves the rearrangement of siloxane bonds. Since the above materials are acidic in nature, it is obviously not possible to carry out copolymerization using alkaline materials. Consequently, to date there has been no practical method for forming copolymers of the above carboxylic disiloxanes with other siloxanes such as dimethylsiloxanes. Such copolymers are desirable because it would allow the formation of siloxanes in which the molecules have terminal units bearing carboxyl groups.

It is an object of this invention to provide intermediate compounds for use in preparing organopolysiloxanes having carboxyl groups in the molecule. Another object is to prepare materials which are useful for coating compositions, lubricants and additives for conventional siloxane fluids and resins.

This invention relates to silanes of the formula XOC(CH₂)ₙSi(CH₃)₂X where X is alkoxy or chlorine and $n$ has a value from 2 to 5 inclusive.

The silanes where X is chlorine are prepared by reacting the corresponding disiloxane dicarboxylic acids supra with thionyl chloride. As a result of this reaction, the carboxyl group is converted to an acyl chloride group and the siloxane linkage is cleved to give a chlorosilane.

The silanes in which X is alkoxy are prepared by refluxing the corresponding dicarboxylic acids supra in an acidic alcoholic solution. This causes esterification of both the silicon and the carboxyl group. For the purpose of this invention, any primary monohydric alcohol may be employed in this method. Operative alcohols are, for example, methanol, propanol and octadecanol.

Another method by which the above alkoxy silanes can be prepared is by reacting the corresponding chlorosilanes supra with monohydric alcohols. If desired, a hydrogen halide acceptor such as pyridine may be used in the reaction. In this procedure any monohydric alcohol may be employed such as for example methanol, tertiary butanol and isopropanol.

In accordance with this invention, the above hydrolyzable silanes are cohydrolyzed with silanes of the formula RₘSiX₄₋ₘ, where R is a monovalent hydrocarbon radical free of C≡C linkages, m has a value from 0 to 3, and X is chlorine or alkoxy, to give the siloxanes of this invention. This cohydrolysis is carried out in the normal manner for cohydrolyzing silanes. For example, the mixed silanes may be added to a mixture of solvent and water. Suitable solvents include toluene, ether, and dioxane. After hydrolysis is complete, the resulting copolymeric siloxane is washed free of acid. In carrying out the cohydrolysis, it is preferred that the temperature be kept below about 50° C. in order to avoid formation of lactones. Once the cohydrolysis has been completed, the resulting copolymer may then be heated at a higher temperature in order to increase its degree of polymerization.

The siloxanes which are prepared according to the method of this invention are copolymers containing from .001 to 99 mol per cent siloxane units of the formula HOOC(CH₂)ₙ(CH₃)₂SiO₁/₂, where $n$ has a value from 2 to 5 inclusive, and from 1 to 99.999 mol per cent siloxane units of the formula $$R_mSiO_{\frac{4-m}{2}}$$

where R is a monovalent hydrocarbon radical free of C≡C linkages and m is an integer from 0 to 3 inclusive. In the copolymers there is an average of from .9 to 3 of the defined organic radicals per Si atom.

The copolymers of this invention can contain siloxane units of the formulae SiO₂, RSiO₃/₂, R₂SiO or R₃SiO₁/₂. These units may be present in any combination which gives an average of at least .9 organic groups per silicon atom.

The monovalent hydrocarbon-substituted siloxanes within the scope of this invention may have any monovalent hydrocarbon radical attached to the silicon except those radicals which contain acetylenic linkages. Thus, the siloxanes may be substituted with alkyl radicals, such as ethyl, methyl or octadecyl; cycloalkyl radicals such as cyclohexyl and cyclopentyl; linear and cyclic olefinic radicals such as cyclohexenyl, vinyl, allyl, and octadecenyl; aromatic hydrocarbon radicals such as phenyl, tolyl, xylyl, naphthyl, and xenyl; and aralphatic radicals such as benzyl, ethylphenyl, and vinylphenyl.

The copolymers of this invention are useful as coating compositions for metals, fabric and ceramic articles.

The following examples are illustrative only and are not to be construed as limiting the invention which is properly delineated in the appended claim.

Example 1

55.7 g. of the acid

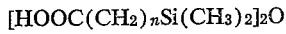
[HOOCCH₂CH₂Si]₂O
                |
              (CH₃)₂ was mixed all at once with 71.4 g. of SOCl₂. The mixture was warmed at 40° to 45° C. for 4½ hours with stirring. Upon distillation of the product, 61.2 g. of

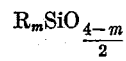
ClOCCH₂CH₂SiCl
              |
           (CH₃)₂ boiling at 77° C. to 78° C. at 12 mm. and having a refractive index at 20° C. of 1.4568 was obtained.

Example 2

When the acids shown below are reacted with thionyl chloride in the manner of Example 1, the following chlorosilanes are obtained.

| | Acid | Chlorosilane |
|---|---|---|
| 1 | [HOOC(CH₂)₃Si-]₂O<br>        (CH₃)₂ | ClOC(CH₂)₃SiCl<br>        (CH₃)₂ |
| 2 | [HOOC(CH₂)₄Si-]₂O<br>        (CH₃)₂ | ClOC(CH₂)₄SiCl<br>        (CH₃)₂ |
| 3 | [HOOC(CH₂)₅Si-]₂O<br>        (CH₃)₂ | ClOC(CH₂)₅SiCl<br>        (CH₃)₂ |

Example 3

139.2 g. of

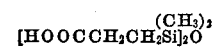
[HOOCCH₂CH₂Si]₂O
                |
              (CH₃)₂ was mixed with 300 cc. of ethanol, 400 cc. of benzene and 3 ml. of concentrated hydrochloric acid. The mixture was refluxed over a period of 10 to 11 days during which time water was removed. At the end of this time, the mixture was fractionated to give 110 g. of

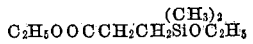

boiling at 92° C. at 2 mm. and having a refractive index at 20° C. of 1.4201.

*Example 4*

When the acids of Example 2 are treated in accordance with the method of Example 3, the following esters are obtained.

| Acid | Ester |
| --- | --- |
| 1 | $C_2H_5OOC(CH_2)_3Si(CH_3)_2(OC_2H_5)$ |
| 2 | $C_2H_5OOC(CH_2)_4Si(CH_3)_2(OC_2H_5)$ |
| 3 | $C_2H_5OOC(CH_2)_6Si(CH_3)_2(OC_2H_5)$ |

*Example 5*

When one mol of $ClO(CH_2)_2Si(CH_3)_2Cl$ is mixed with 10 mols of dimethyldichlorosilane and the mixture is added slowly to an agitated mixture of 500 g. of ice and one liter of toluene, a fluid cohydrolyzate comprising dimethylsiloxane chains end-blocked with

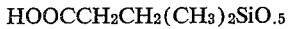

units is obtained.

*Example 6*

The following copolymers are obtained when the corresponding chlorosilanes are cohydrolyzed in accordance with the procedure of Example 5.

| | Chlorosilane | Siloxane | Mol Percent of total copolymer |
| --- | --- | --- | --- |
| 1 | $C_6H_5(CH_3)SiCl_2$ | phenylmethylsiloxane | 20 |
| | $CH_3SiCl_3$ | monomethylsiloxane | 30 |
| | $C_6H_5SiCl_3$ | monophenylsiloxane | 30 |
| | $ClOC(CH_2)_3Si(CH_3)_2Cl$ | $HOOC(CH_2)_3SiO_{1/2}$ | 20 |
| | $C_{18}H_{37}SiCl_3$ | monooctadecylsiloxane | 5 |
| | $(C_4H_9)_2SiCl_2$ | dibutylsiloxane | 15 |
| | $C_6H_{10}(CH_3)_2SiCl$ | cyclohexyldimethylsiloxane | 5 |
| 2 | $C_2H_3(CH_3)SiCl_2$ | vinylmethylsiloxane | 25 |
| | $CH_3SiCl_3$ | monomethylsiloxane | 48 |
| | $ClOC(CH_2)_5Si(CH_3)_2Cl$ | $HOOC(CH_2)_5SiO_{1/2}$ | 2 |
| 3 | $(C_6H_5)_2SiCl_2$ | diphenylsiloxane | 99.98 |
| | $ClOC(CH_2)_4Si(CH_3)_2Cl$ | $HOOC(CH_2)_4SiO_{1/2}$ | .02 |

That which is claimed is:

A method of preparing copolymeric siloxanes which comprises cohydrolyzing a compound of the formula $XOC(CH_2)_nSi(CH_3)_2X$, where X is selected from the group consisting of chlorine and alkoxy radicals and $n$ is an integer from 2 to 5 inclusive, with a silane of the formula $R_mSiX_{4-m}$, where R is a monovalent hydrocarbon radical free of $C\equiv C$ linkages, and X is selected from the group consisting of chlorine and alkoxy radicals and $m$ has a value from 0 to 3 inclusive, at a temperature below 50° C.

References Cited in the file of this patent

UNITED STATES PATENTS

| | | |
| --- | --- | --- |
| 2,486,162 | Hyde | Oct. 25, 1949 |
| 2,500,761 | Lewis | Mar. 14, 1950 |
| 2,589,446 | Sommer | Mar. 18, 1952 |
| 2,589,447 | Sommer | Mar. 18, 1952 |

OTHER REFERENCES

Sommer et al.: "Jour. Am. Chem. Soc.," vol. 72 (1950) pages 1935–1939.